C. HERSOME.

Buckle.

No. 8,655. Reissued April 1, 1879.

WITNESSES:

Jas. E. Hutchinson.

J. A. Rutherford

INVENTOR.

C. Hersome,

By James L. Norris

Attorney.

N. PETERS, PHOTO-LITHOGRAPHER, WASHINGTON, D. C.

UNITED STATES PATENT OFFICE.

CALVIN HERSOME, OF BOSTON, MASSACHUSETTS.

IMPROVEMENT IN BUCKLES.

Specification forming part of Letters Patent No. 206,785, dated August 6, 1878; Reissue No. 8,655, dated April 1, 1879; application filed March 1, 1879.

*To all whom it may concern:*

Be it known that I, CALVIN HERSOME, of Boston, in the county of Suffolk and State of Massachusetts, have invented certain new and useful Improvements in Buckles, of which the following is a specification:

The object of my invention is to produce a buckle in the frame of which the ordinary cross-bar is dispensed with and replaced by short journals, thus making the buckle lighter, and obviating the trouble and inconvenience heretofore experienced from the bending and breaking of these cross-bars in buckles now in use, and also to increase the security of attachment between the strap-plate and strap; and to this end it consists—

First, in a buckle-frame having short journals formed on its side bars, in combination with a plate having bearings adapted to fit said journals, and provided with a tongue pivoted to its front end, and with suitable means for attachment to a shoe or boot, thus dispensing with the ordinary cross-bar, which has heretofore been a source of trouble and inconvenience on account of its tendency to bend and break, throwing the tongue out of position, or permitting it to escape connection with the frame.

Second, in a buckle-frame having housed journals projecting from opposite points of its side bars, in combination with a strap-plate having bearings adapted to fit said journals, and provided with a tongue pivoted to its front end, and with suitable means for attachment to a shoe or boot. The housings firmly brace the journals and support their projecting ends against the strain of the attaching-plate.

Third, in a buckle having a hinged attaching-plate provided with three fastening-prongs struck from said plate, the central prong being located on a different transverse line from the others, in order that the strain at the points of attachment upon the article to which the buckle is secured may be distributed over a considerable space, thus obviating the tendency to tear the article which would obtain were the prongs in line with each other.

Fourth, the combination, with a buckle-frame having short journals projecting from its side bars, of an attaching-plate having at one end a swinging tongue pivoted directly upon said plate and bearings fitted to said journals, and at the other end suitable means for attachment to a boot or shoe, as hereinafter particularly described.

Figure 1:
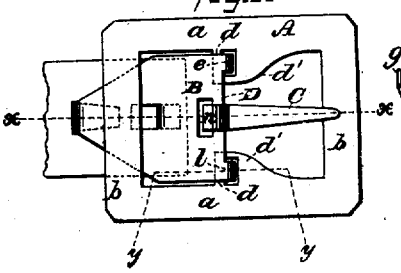
Figure 2:
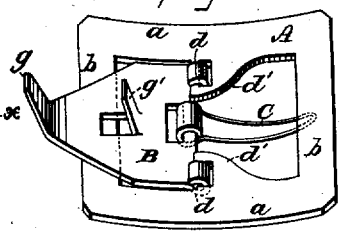
Figure 3:
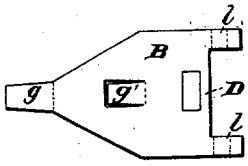
Figure 4:
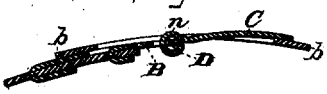
Figure 5:
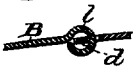
Figure 6:
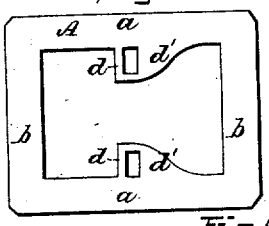
Figure 7:
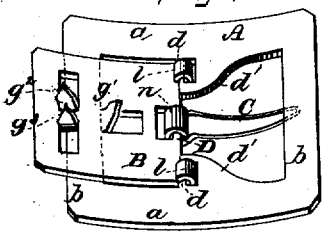
Figure 8:
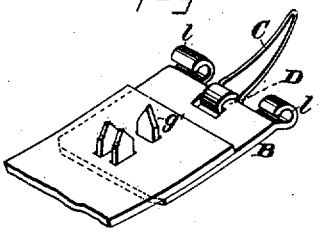
Figure 9:
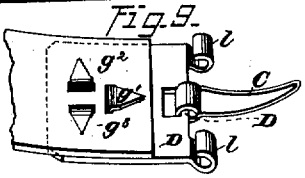
Figure 10:
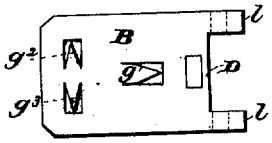
Figure 11:
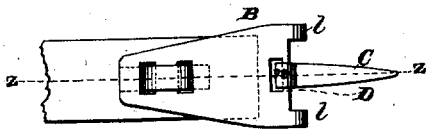
Figure 12:
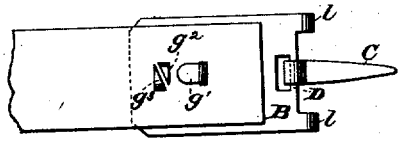
Figure 13:
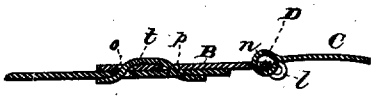
Figure 14:
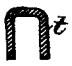

In the accompanying drawings, Figure 1 is a face view of a buckle constructed according to my invention attached to a standing strap. Fig. 2 is a bottom view with the prongs of the fastening-plate extended. Fig. 3 is a plan view of the fastening or attaching plate detached. Fig. 4 is a section on line *x x*, Fig. 1. Fig. 5 is a section on line *y y*, Fig. 1. Fig. 6 is a plan view of the buckle-frame detached. Fig. 7 is a bottom view of a buckle having a modified construction of attaching-plate, and Fig. 8 is a perspective view of this form of attaching-plate with its prongs projecting through a strap. Fig. 9 shows the prongs bent down upon the strap for holding it in place. Fig. 10 is a plan view of a three-prong plate as it is formed by the die. Fig. 11 is a detached view of an attaching-plate secured to a strap by a staple. Fig. 12 is a view of an attaching-plate secured to a strap by a modified form of prongs. Fig. 13 is a section on line *z z*, Fig. 11. Fig. 14 is a view of the staple before insertion through the plate and strap.

In the drawings, A represents the frame, B the attaching-plate, and C the tongue, of my improved buckle.

The frame A is composed of two parallel side bars, *a a*, and two parallel end bars, *b b*, and the inner edge of each side bar, *a*, has a similar inwardly-projecting journal, *d*, the inner end of each of which is connected to a housing, *d'*, projecting from the inner edge of the side bar, and forming a support and brace for the said inner ends of the journals.

The attaching-plate B has a width equal to the inner width of the frame A, and in its width has prongs $g$ $g^1$, and at one end, *h*, two ear-pieces or bearings, *l l*, midway between which is an eye, the outer boundary of which is a pivot or journal, D.

The tongue C is of the usual construction in buckles.

Each ear-piece *l l* of the attaching-plate is bent around a journal, *d*, and thus hinges the plate B to the frame A, and the end *n* of the tongue C is bent around the journal D of the attaching-plate B, and thus the buckle is made complete for use, and in being used it is fastened to the standing strap by passing the prongs $g$ $g^1$ of the attaching-plate B through slits properly cut in the strap to receive them, and then bending and clinching such prongs over and upon the under side of the standing strap or other suitable part.

In Figs. 1 and 2 the attaching-plate is shown as provided with two prongs, $g$ $g^1$, and in Figs. 7 and 8 as provided with three prongs, $g^1$ $g^2$ $g^3$, and in each instance the prongs are in one piece with the plate B, and are made therefrom by suitably cutting the metal of the plate to produce them; but in Figs. 11, 13 a staple, $t$, is used separate from the plate B, and passed through slits $o$ $p$ in the attaching-plate B.

The buckle-frame, with its journals and housings, the attaching-plate B, with its prongs $g$ $g^1$ or slits $o$ $p$, for the passage of prongs or staples through it, and its ear-pieces $l$ $l$ and pivot D, as well as the tongue C, are made of sheet metal, and each part is preferably in one piece, and is produced by punching it from a piece of metal of suitable size.

In those modifications of my attaching-plate in which three prongs are used it will be seen that the center prong prevents the entire strain upon the fastening-plate from being at any time thrown upon either of the side prongs; and it will also be seen that by bending this central prong down upon the strap or flap in an opposite direction, or at an angle to the others, as shown in Fig. 9, the plate will be prevented from slipping in either direction and becoming detached from the boot, shoe, or other article, and by arranging the central prong on different transverse line from the others the strain of the prongs upon the strap or flap is distributed out of a straight line, and the slits for the prongs are not required to be cut so close together, and so weaken the strap or flap, as when the said prongs are in line.

I do not claim an attaching-plate having two prongs, one of which is located at the end of said plate, while the other is cut from the internal portion of said plate, both of said prongs being in line with each other, as such is old and well known.

Having now fully described my invention, what I claim is—

1. A buckle-frame having short journals formed on its side bars, in combination with a plate having bearings adapted to fit said journals, and provided with a tongue pivoted to its front end, and with suitable means for attachment to a shoe or boot, substantially as described.

2. A buckle-frame having housed journals projecting from opposite points of its side bars, in combination with an attaching-plate having bearings adapted to fit said journals, and provided with a tongue pivoted to its front end, and with suitable means for attachment to a boot or shoe, substantially as described.

3. A buckle having a hinged attaching-plate, provided with three fastening-prongs struck from said plate, the central prong being located on a different transverse line from the others, substantially as described.

4. The combination, with a buckle-frame, of an attaching-plate pivoted or hinged to said frame, the said plate carrying an independent tongue, substantially as described.

5. The combination, with a buckle-frame having short journals projecting from its side bars, of an attaching-plate having at one end a tongue pivoted thereto and bearings fitted to said journals, and at the other end suitable means for attachment to a strap or flap of a boot or shoe, substantially as described.

In testimony that I claim the foregoing I have hereunto set my hand in the presence of two witnesses.

CALVIN HERSOME.

Witnesses:
JAMES L. NORRIS,
JAS. A. RUTHERFORD.